US009761276B1

(12) United States Patent
Bell et al.

(10) Patent No.: US 9,761,276 B1
(45) Date of Patent: Sep. 12, 2017

(54) PRIORITIZED PLAYBACK OF MEDIA CONTENT CLIPS

(71) Applicant: International Business Machines Corporation, Armonk, NY (US)

(72) Inventors: David R. Bell, Southampton (GB); Darren J. Sullivan, Southampton (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/269,763

(22) Filed: Sep. 19, 2016

(51) Int. Cl.
*H04N 9/80* (2006.01)
*G11B 27/031* (2006.01)

(52) U.S. Cl.
CPC .................. *G11B 27/031* (2013.01)

(58) Field of Classification Search
USPC ........................................ 386/278, 241, 248
See application file for complete search history.

(56) References Cited

U.S. PATENT DOCUMENTS

| 5,862,230 | A * | 1/1999 | Darby ....................... H04S 1/00 |
| | | | 381/56 |
| 6,760,309 | B1 * | 7/2004 | Rochberger ...... H04L 29/06027 |
| | | | 370/229 |
| 8,243,203 | B2 | 8/2012 | Suh |
| 8,929,721 | B2 | 1/2015 | Cottrell |
| 9,129,008 | B1 | 9/2015 | Kuznetsov |
| 2011/0217019 | A1 * | 9/2011 | Kamezawa .......... H04N 9/8042 |
| | | | 386/224 |
| 2012/0189273 | A1 * | 7/2012 | Folgner ................ H04N 9/8227 |
| | | | 386/241 |
| 2013/0226983 | A1 | 8/2013 | Beining et al. |
| 2014/0255000 | A1 | 9/2014 | Kao et al. |
| 2016/0225410 | A1 * | 8/2016 | Lee ........................ G11B 27/10 |

OTHER PUBLICATIONS

Reddit inc., © 2016, "Plays.tv—Automatically creates video highlights of every K/D/A, Dragon/Baron kill, and more", retrieved Sep. 15, 2016, 23 pages. <https://www.reddit.com/r/leagueoflegends/comments/3b40iu/playstv_automatically_creates_video_highlights_of/>.
Hannon, J. et al., "Personalized and Automatic Social Summarization of Events in Video", Proceedings of the 16th International Conference on Intelligent User Interfaces (IUI'11), Feb. 13-16, 2011, Palo Alto, California, USA, pp. 335-338. <http://researchrepository.ucd.ie/bitstream/handle/10197/2952/p335-hannon.pdf?sequence=1>.

(Continued)

*Primary Examiner* — Nigar Chowdhury
(74) *Attorney, Agent, or Firm* — Patterson + Sheridan, LLP

(57) ABSTRACT

Systems, methods, and computer program products to perform an operation comprising receiving a request to create a clip of a media file, wherein the request specifies a time duration for the clip, computing a metric value for each of a plurality of segments of the media file, identifying, based on the plurality of metric values, a first segment of the plurality of segments of the media file, wherein the metric value for the first segment of the media file exceeds a threshold metric value, and generating the clip of the media file, wherein the clip of the media file includes at least the first segment of the media file.

20 Claims, 10 Drawing Sheets

(56) References Cited

OTHER PUBLICATIONS

Xian, Y., et al., "Video Highlight Shot Extraction with Time-Sync Comment", Proceedings of the 7th International Workshop on Hot Topics in Planet-scale mObile computing and online Social neTworking (HOTPOST'15), pp. 31-36 (abstract only). <http://dl.acm.org/citation.cfm?id=2757516>.

BBC R&D © 2016, "Prototyping a way to detect TV highlights", retrieved Sep. 15, 2016, posted Aug. 19, 2014, last updated Nov. 2, 2015, 9 pages <http://www.bbc.co.uk/rd/blog/2014-07-how-we-built-the-highlights-project>.

Raventós, A. et al., "Automatic Summarization of Soccer Highlights Using Audio-Visual Descriptors", submitted Nov. 2014, retrieved Sep. 15, 2016, 18 pages <http://arxiv.org/ftp/arxiv/papers/1411/1411.6496.pdf>.

* cited by examiner

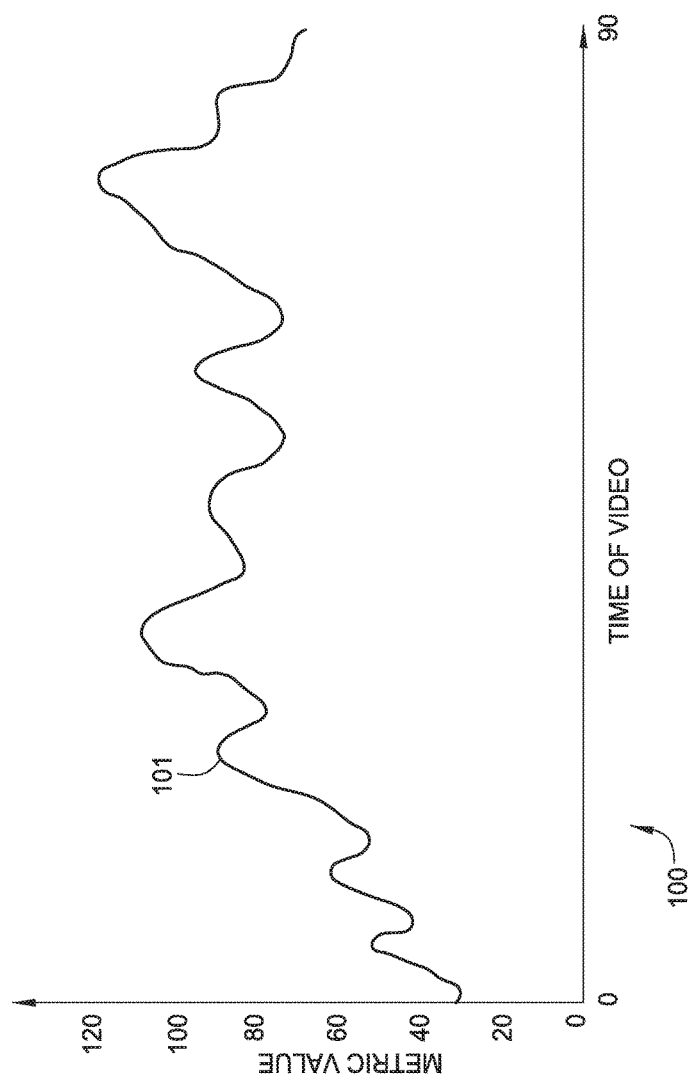

US 9,761,276 B1

PRIORITIZED PLAYBACK OF MEDIA CONTENT CLIPS

BACKGROUND

The present invention relates to computer software, and more specifically, to computer software which provides prioritized playback of media content clips.

Users often do not have enough time to consume all of the multimedia content they would like. Indeed, the proliferation of videos, music, podcasts, and the like means that users must make a decision on what to watch, view, or listen to in their limited amounts of free time. Furthermore, for content having long durations of time, users may have difficulty identifying the most relevant portions of the items of content.

SUMMARY

In one embodiment, a method comprises receiving a request to create a clip of a media file, wherein the request specifies a time duration for the clip, computing a metric value for each of a plurality of segments of the media file, identifying, based on the plurality of metric values, a first segment of the plurality of segments of the media file, wherein the metric value for the first segment of the media file exceeds a threshold metric value, and generating the clip of the media file, wherein the clip of the media file includes at least the first segment of the media file.

In another embodiment, a system comprises a processor and a memory storing instructions, which when executed by the processor, performs an operation comprising receiving a request to create a clip of a media file, wherein the request specifies a time duration for the clip, computing a metric value for each of a plurality of segments of the media file, identifying, based on the plurality of metric values, a first segment of the plurality of segments of the media file, wherein the metric value for the first segment of the media file exceeds a threshold metric value, and generating the clip of the media file, wherein the clip of the media file includes at least the first segment of the media file.

In another embodiment, a computer-readable storage medium has computer-readable program code embodied therewith, the computer-readable program code executable by a processor to perform an operation comprising receiving a request to create a clip of a media file, wherein the request specifies a time duration for the clip, computing a metric value for each of a plurality of segments of the media file, identifying, based on the plurality of metric values, a first segment of the plurality of segments of the media file, wherein the metric value for the first segment of the media file exceeds a threshold metric value, and generating the clip of the media file, wherein the clip of the media file includes at least the first segment of the media file.

BRIEF DESCRIPTION OF THE SEVERAL VIEWS OF THE DRAWINGS

FIGS. 1A-1F illustrate techniques to generate prioritized portions of media content, according to various embodiments.

DETAILED DESCRIPTION

Figure 1B:
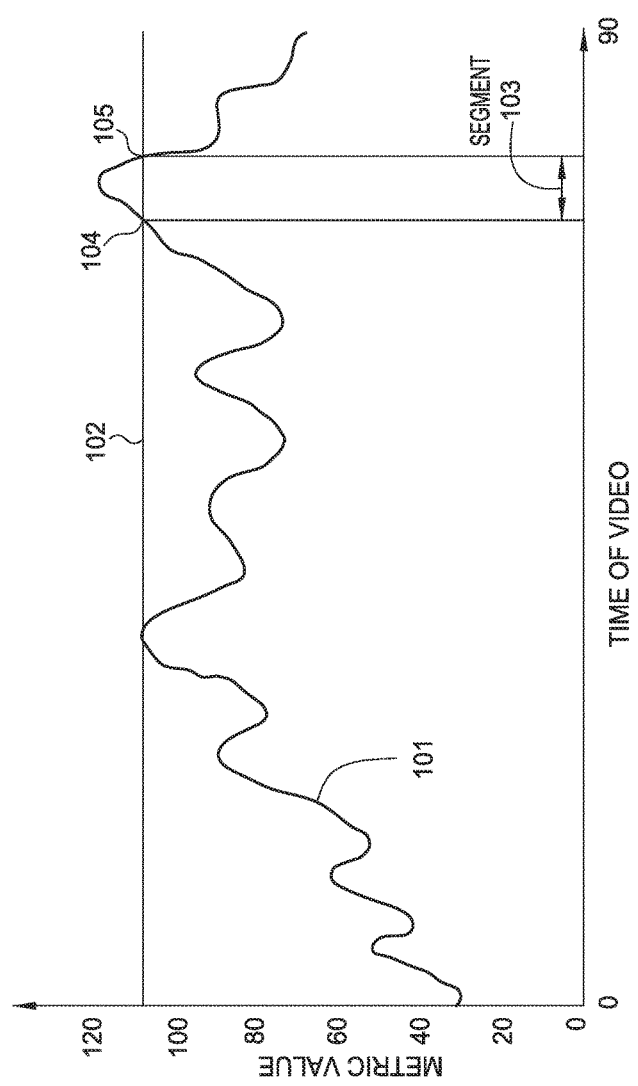

Embodiments disclosed herein provide techniques to create highlight clips of items of multimedia content based on user-specified time duration for the clips and a ranking of each of a plurality of segments of the items of multimedia content. Furthermore, as a user is consuming the generated highlight clips, the highlight clips may be dynamically modified based on user input specifying to alter the time duration. For example, a user may initially specify to create a ten minute highlight clip of a thirty minute video. As such, embodiments disclosed herein may analyze the thirty minute video podcast to identify the most interesting or relevant portions of the video to create the ten minute highlight clip. As the user consumes the ten minute highlight clip of the video, the user may modify the time duration of the highlight clip. For example, the user may increase the time duration from ten minutes to fifteen minutes after consuming five minutes of the highlight clip. In response, embodiments disclosed herein may modify the clip to include five additional minutes of the video, where the five additional minutes are based on the analysis of the thirty minute video.

Video files are used herein as a reference example of multimedia content. However, the disclosure is equally applicable to all types of multimedia content, including, without limitation, a sequence of digital images, digital audio files, and the like.

FIG. 1A illustrates a graph 100 used to generate prioritized media content clips, according to one embodiment. As shown, the x-axis of the graph 100 reflects a time of an example video, while the y-axis reflects a metric value computed for the corresponding time of the video. The metric value may be computed by any algorithm which computes a value reflecting one or more attributes of each segment of the video. The attributes include, without limitation, a sentiment, an importance, a significance, a popularity, and/or a relevance of each segment of the video. The algorithm may consider all aspects of the video, as well as outside factors reflecting the attribute values of the video. For example, an analysis of the image and audio data of the video may be used to identify faces, significant events, motion, speech, and the like in the video. The algorithm may then compute a higher score for those portions of the video that have people, significant events, motion, and/or speech, and a lower score for those portions of the video that lack people, significant events, motion, or speech. The score may be further based on social media trends during a broadcast of the video, an analysis of sentiment of social media posts, and the like. For example, for a video of a soccer game, the algorithm may compute higher metric scores based on one or more of: when goals are scored in the soccer game, when crowd noise levels are elevated, and when the ball and/or players are located in specific areas of the field. Similarly, the algorithm may compute lower metric scores when a break in the game action occurs, when players are being substituted, or when the crowd noise levels are low.

Therefore, embodiments disclosed herein divide the video into a plurality of predefined time segments (e.g., 1 second, 5 second, 10 second, or 1 minute segments), and compute a metric value for each of the segments as described above. Embodiments disclosed herein may then plot the metric values against time. As shown, therefore, a line 101 of the graph 100 reflects each a plurality of metric values computed for the video.

Embodiments disclosed herein may use the line 101 of the graph 100 to create a highlight clip of a video, where the highlight clip includes the portions of the video having the highest metric values (and therefore, the most important, entertaining, etc., portions of video). For example, as shown, the x-axis of the graph 100 goes from 0 to 90 minutes, reflecting a 90 minute video (e.g., a video of a soccer match). A user may then request to create a 10-minute highlight clip of the video. As described below, embodiments disclosed herein may generate the 10-minute highlight clip to include the segments of video that have the highest metric values.

FIG. 1B depicts techniques to identify segments of a video for inclusion in a highlight clip, according to one embodiment. As shown, a threshold line 102 has been drawn on the graph 100. The threshold line 102 corresponds to an example threshold value for the metric value of the y-axis of the graph. Once the threshold line 102 is defined, embodiments disclosed herein identify any points of intersection between the threshold line 102 and the line 101. As shown, two such intersection points 104, 105 exist in the graph 100. As such, embodiments disclosed herein may identify a segment 103 of the video for inclusion in a highlight clip generated for the associated video. The segment 103 is defined by the points 104, 105, and includes the video occurring between the times of the video corresponding to the x-axis at the points 104, 105 (e.g., between 73 and 75 minutes of the video). In some cases, a segment may be defined by fewer than two intersection points. For example, the curve 100 may begin above the threshold line 102, intersect with the threshold line once, and remain below the threshold line 102 for the remainder of the video. In such an example, the segment is defined by the start of the video and the single intersection point. More generally, the segments are defined by any portion of the curve 100 with values greater than the threshold line 102.

If the time duration of the segment 103 is less than the requested duration of time for the highlight clip, embodiments disclosed herein may continue to lower the threshold value until the aggregate time duration of all identified segments approximately equals the requested time duration for the highlight clip. If the duration of the segment 103 is greater than the requested duration of time, embodiments disclosed herein may reduce the duration of the segment 103. For example, the threshold line 102 may be increased to reduce the duration of a resulting segment. As another example, embodiments disclosed herein may remove a predefined number of frames of video (and corresponding audio) from the start and/or end of the segment 103 until the duration of the segment 103 is approximately equal to the requested time duration.

Figure 1C:
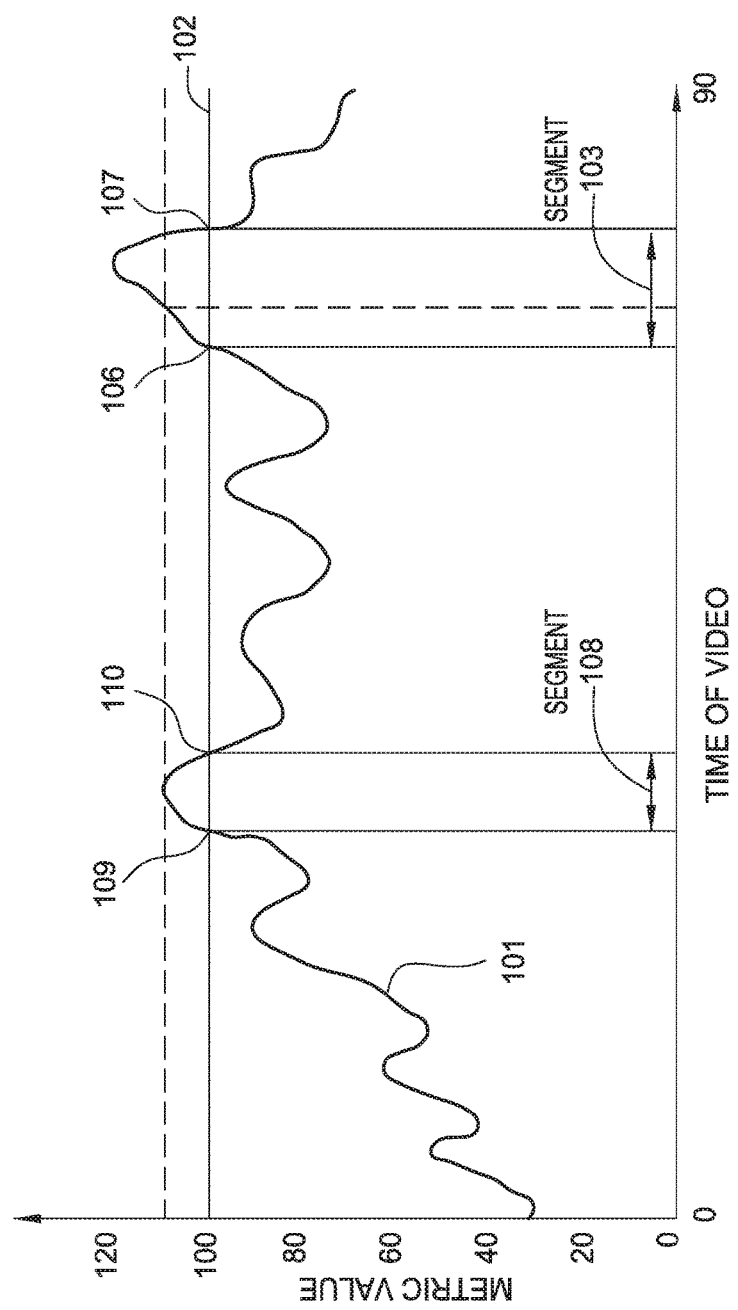

FIG. 1C depicts an embodiment where the threshold line 102 has been moved to a lower metric value than the corresponding metric value 102 in FIG. 1B. As shown, lowering the threshold line 102 causes the threshold line 102 to intersect with the line 101 at points 106, 107, 109, and 110. Generally, subsequent to identifying intersection points between the line 101 and the threshold line 102, embodiments disclosed herein generate an ordered list of intersection points (based on the corresponding time value), and identify the first ordered intersection point (i.e., point 109 in FIG. 1C). Embodiments disclosed herein may then determine whether the slope of the line 101 at the first intersection point is negative (e.g., the line 101 is at a downward slope at point 109). If the slope of the line 101 at the first intersection point is negative, then embodiments disclosed herein set a value, tdelta, to be the x value at the first intersection point. If the slope is not negative, then embodiments disclosed herein set the value of tdelta to be zero. Then, for each remaining intersect point, embodiments disclosed herein set tdelta=tdelta+(the x value at the next intersection point–the x value at the current intersection point). If there are no more remaining intersection points, the last x value (e.g., the greatest x value, corresponding to the end of the video) is substituted for the "next intersection point" in the formula above. As such, a segment of video may be defined by tdelta and the corresponding intersection points. As the loop iterates through each intersection point, corresponding segments of video may be identified.

Therefore, as shown in FIG. 1C, reducing the threshold value for the threshold line 102 has caused segment 103 to increase in total duration, as segment 103 is defined by intersection points 106, 107. Furthermore, reducing the threshold value for the threshold line 102 has created a new segment 108, defined by intersection points 109, 110. Again, if the total time duration of the segments 103, 108, approximately equals the time duration for the video clip requested by the user, embodiments disclosed herein may generate the video clip using segments 103 and 108. In at least one embodiment, if the total time duration of identified segments is within a threshold amount of the requested time duration, the endpoints of one or more of the segments may be modified to match the requested time duration. In another embodiment, if the total time duration of identified segments is within a threshold amount of the requested time duration, the clip may be generated using the identified segments without modification.

Figure 1D:
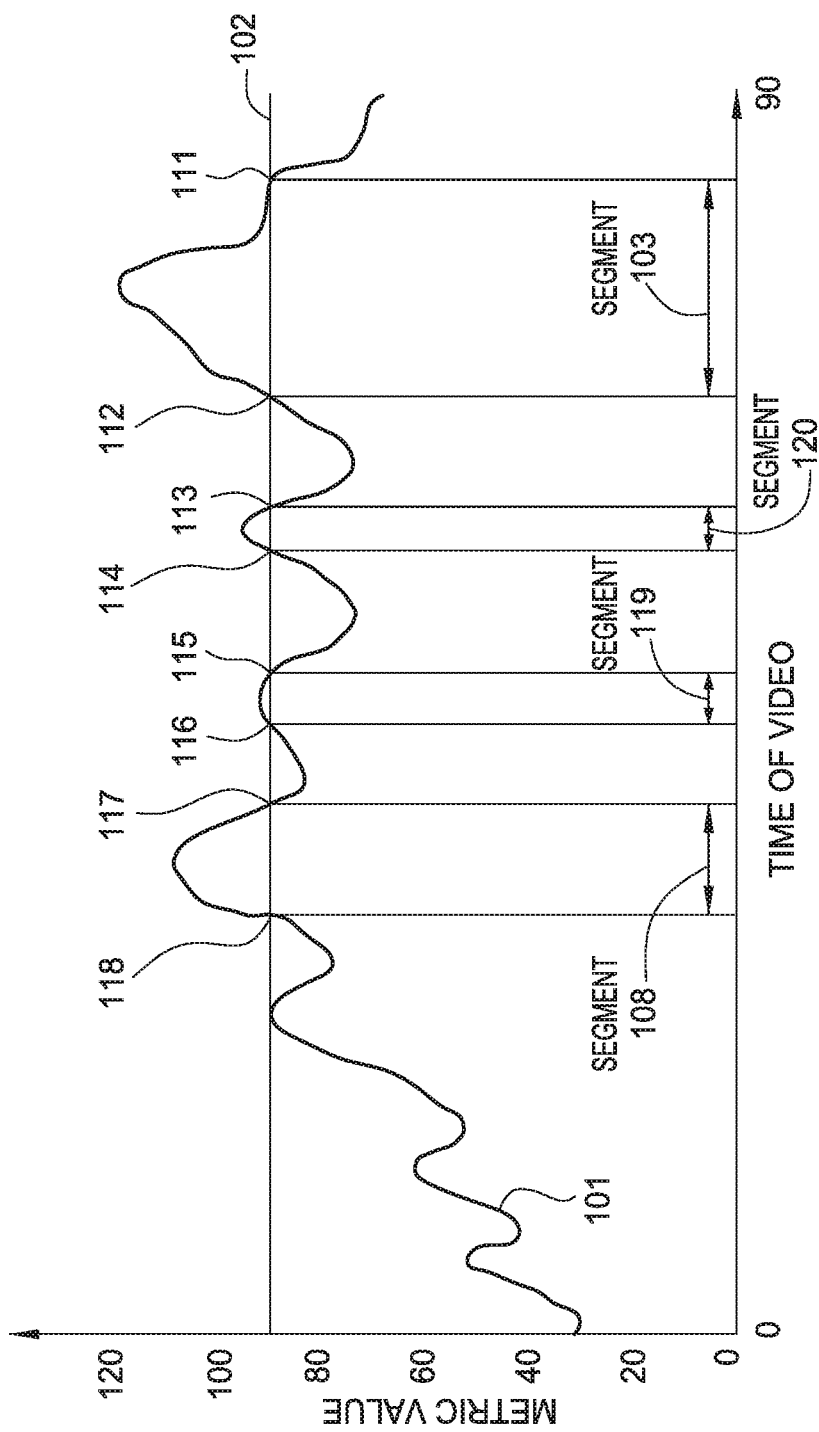

FIG. 1D depicts an embodiment where the threshold line 102 has been moved to a lower metric value than the metric value associated with the threshold line 102 in FIG. 1C. As shown, lowering the threshold value for the threshold line 102 results in four segments of video, namely segments 103, 108, 119, and 120. As shown, the duration of segments 103 and 108 have increased relative to their respective time durations in FIG. 1C. Specifically, as shown, segment 103 is defined by intersection points 111 and 112, while segment 108 is defined by intersection points 117, 118. As shown, segment 119 is defined by intersection points 115, 116, while segment 120 is defined by intersection points 113, 114.

Generally, once a highlight clip is created, a user may begin playback of the highlight clip. During playback, however, the user may modify the time duration of the requested highlight clip. Continuing with the previous example, if the user initially requested a ten minute highlight clip of the 90-minute video depicted in the graph 100, the user may then modify the ten-minute request to a different duration of time (e.g., 8 minutes, 12 minutes, and the like).

Figure 1E:
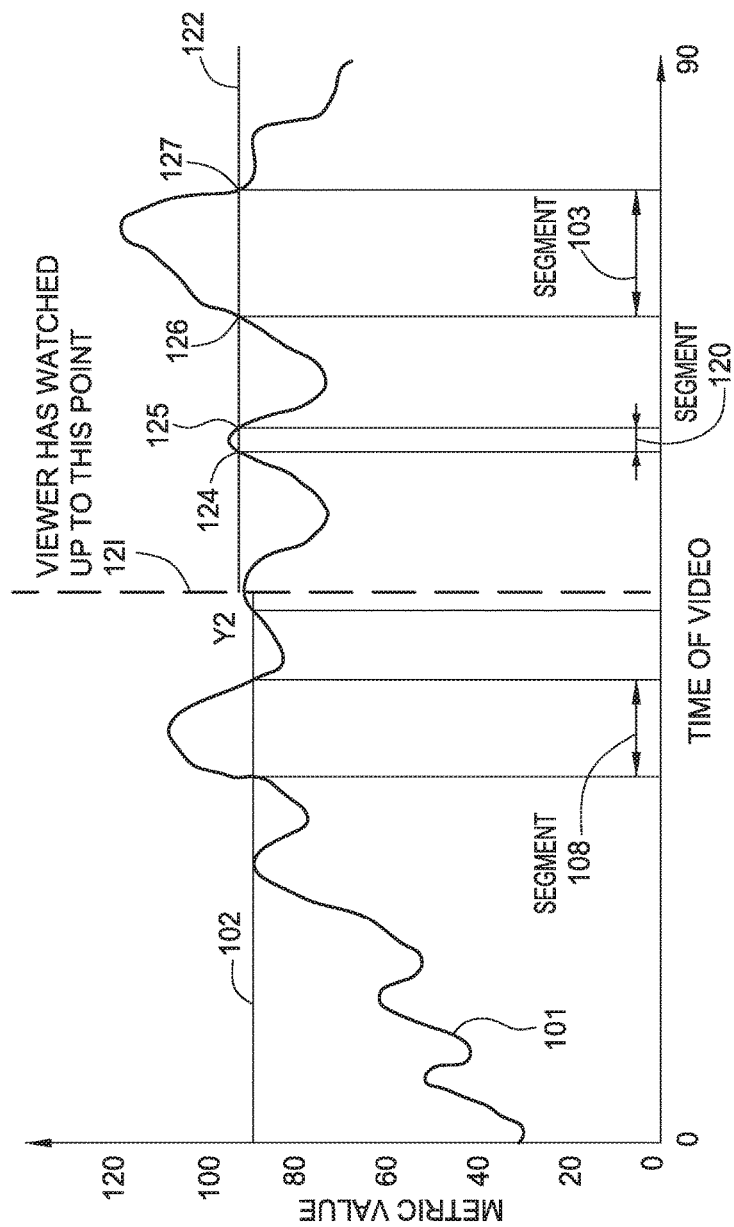

FIG. 1E reflects an embodiment where a user has decreased the requested duration of time for the highlight clip during playback of the highlight (e.g., from 10 minutes to 7 minutes). As shown, playback of the highlight clip has proceeded to the time corresponding to line 121 in the graph 100. Therefore, at the time corresponding to line 121, the segment 108 of the highlight clip was outputted in its entirety, while a portion of segment 119 was outputted. In response to the user input decreasing the requested duration of time for the highlight clip, embodiments disclosed herein modify the threshold line 102 to a new threshold metric value. Specifically, as shown, threshold line 122 corresponds to a metric value that is greater than the metric value of threshold line 102. In response, embodiments disclosed herein may decrease the duration of remaining segments and/or delete the remaining segments to meet the decreased time duration for the video clip. For example, as shown, segment 119 no longer exists, as the metric values of the video corresponding to segment 119 do not intersect with threshold line 122. Additionally, the duration of segments 103 and 120 have been decreased. As shown, segment 103 is now defined by intersection points 126, 127, while segment 120 is now defined by intersection points 124, 125.

Figure 1F:
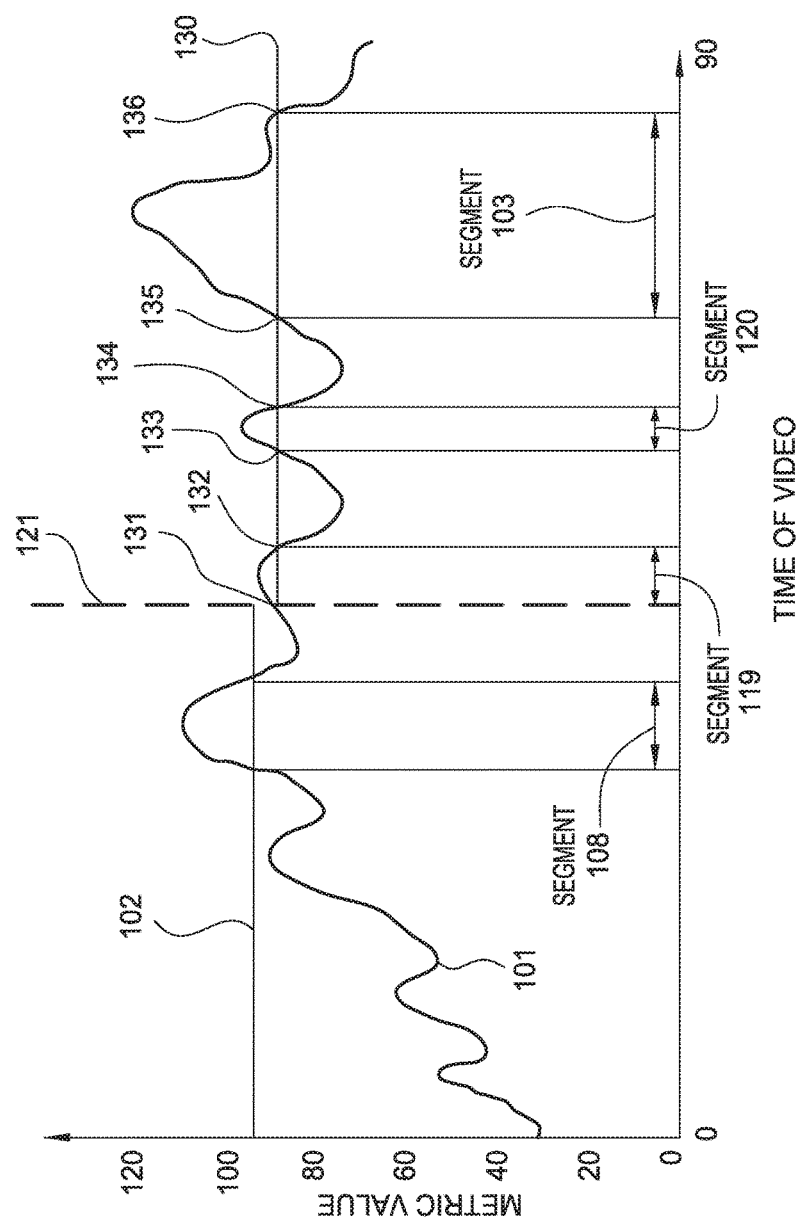

FIG. 1F reflects an embodiment where a user has increased the requested duration of time for the highlight clip during playback of the highlight (e.g., from 10 minutes to 15 minutes, or from 7 minutes in FIG. 1D to 9 minutes). As shown, playback of the highlight clip has proceeded to the time corresponding to line 121 in the graph 100. Therefore, at the time corresponding to line 121, the segment 108 of the highlight clip was outputted in its entirety, while a portion of segment 119 was outputted. In response to the user input increasing the requested duration of time for the highlight clip, embodiments disclosed herein modify the threshold line 102 to a new threshold metric value. Specifically, as shown, threshold line 130 corresponds to a metric value that is less than the metric value of threshold line 102. To meet the increased time duration for the video clip, embodiments disclosed herein may increase the duration of remaining segments, add new segments, and/or increase the duration of previously outputted segments to include additional video surrounding the previously outputted segments. For example, the duration of segments 103, 119, and 120 have been increased. As shown, segment 103 is now defined by intersection points 135, 136, while segment 119 is defined by intersection points 131, 132, and segment 120 is now defined by intersection points 133, 134. Furthermore, while segment 108 was previously outputted, additional material surrounding segment 108 may be included in the modified highlight clip (without replaying the video of segment 108).

Figure 2:
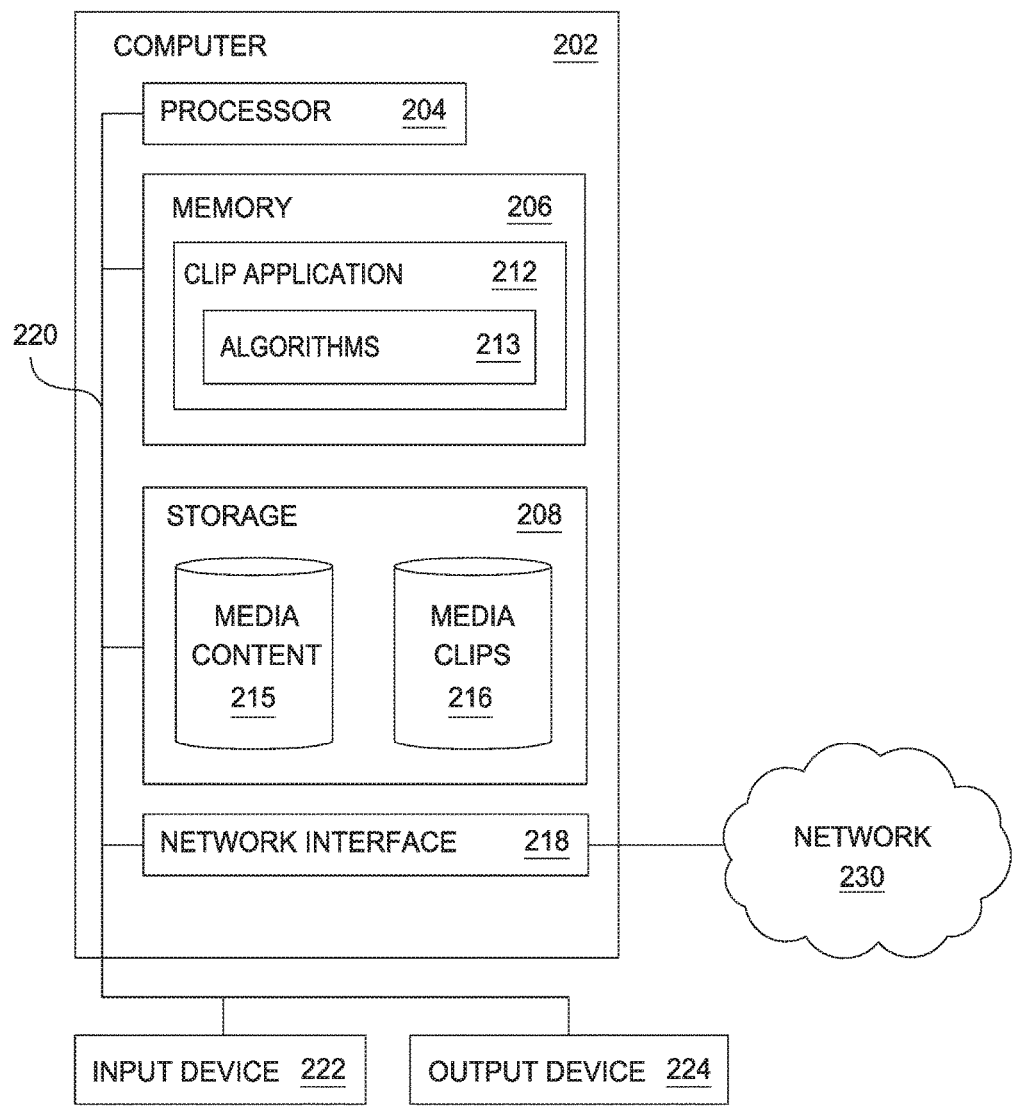
FIG. 2 illustrates an example system which provides prioritized playback of media content clips, according to one embodiment.

FIG. 2 illustrates an example system 200 which provides prioritized playback of media content clips, according to one embodiment. The networked system 200 includes a computer 202. The computer 202 may also be connected to other computers via a network 230. In general, the network 230 may be a telecommunications network and/or a wide area network (WAN). In a particular embodiment, the network 230 is the Internet.

The computer 202 generally includes a processor 204 which obtains instructions and data via a bus 220 from a memory 206 and/or a storage 208. The computer 202 may also include one or more network interface devices 218, input devices 222, and output devices 224 connected to the bus 220. The computer 202 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is a programmable logic device that performs instruction, logic, and mathematical processing, and may be representative of one or more CPUs. The network interface device 218 may be any type of network communications device allowing the computer 202 to communicate with other computers via the network 230.

The storage 208 is representative of hard-disk drives, solid state drives, flash memory devices, optical media and the like. Generally, the storage 208 stores application programs and data for use by the computer 202. In addition, the memory 206 and the storage 208 may be considered to include memory physically located elsewhere; for example, on another computer coupled to the computer 202 via the bus 220.

The input device 222 may be any device for providing input to the computer 202. For example, a keyboard and/or a mouse may be used. The input device 222 represents a wide variety of input devices, including keyboards, mice, controllers, and so on. Furthermore, the input device 222 may include a set of buttons, switches or other physical device mechanisms for controlling the computer 202. The output device 224 may include output devices such as monitors, touch screen displays, and so on.

As shown, the memory 206 contains the clip application 212, which is generally configured to generate clips of items of media content based on user-defined time thresholds and a plurality of metric values computed for the items of media content. As shown, the clip application 212 includes one or more algorithms 213 used to compute metric values for the items of media content (e.g., the items in the media content 215, or remote items of media content that can be downloaded via the network 230). For example, the clip application 212 may divide the item of media content into segments, such as 10 seconds of audio for audio files, 5 seconds of video for video files, and the like. The clip application 212 may then invoke one or more of the algorithms 213 to compute a metric value for each segment of the item of media content. As previously indicated, the metric value may correspond to one or more attributes of the media content, such as sentiment, popularity, importance, relevance, and the like. Furthermore, the algorithms 213 may consider any attribute of the items of media content 215 (e.g., faces in video, crowd noise in audio, etc.), as well as external factors such as sentiment of social media posts related to the items of media content 215, and the like.

Once the metric values are computed, the clip application 212 may plot the metric values versus time in a graph as depicted in FIG. 1A. The clip application 212 may then generate the clips as described above with reference to FIGS. 1B-1F, setting a threshold metric value, and identifying intersection points that define segments of the media file. Once the duration of time of each identified segment approximately equals the time threshold requested by the user, the clip application 212 may generate the clip and store the clip in the media clips 216.

As shown, the storage 208 contains the media content 215 and media clips 216. The media content 215 is a data store which includes a plurality of different types of media content files, such as audio files, image files, and video files. The media clips 216 stores clips generated by the clip application 212, such as audio clips and video clips.

The clip application 212 may further be configured to output the media clips 216 for playback to a user. During playback, the user may modify the requested time duration for the media clip 216. As such, the clip application 212 may modify the media clip 216 as described above with reference to FIGS. 1E-1F, adding and removing segments of the media content 215 to meet the updated time duration.

Figure 3:
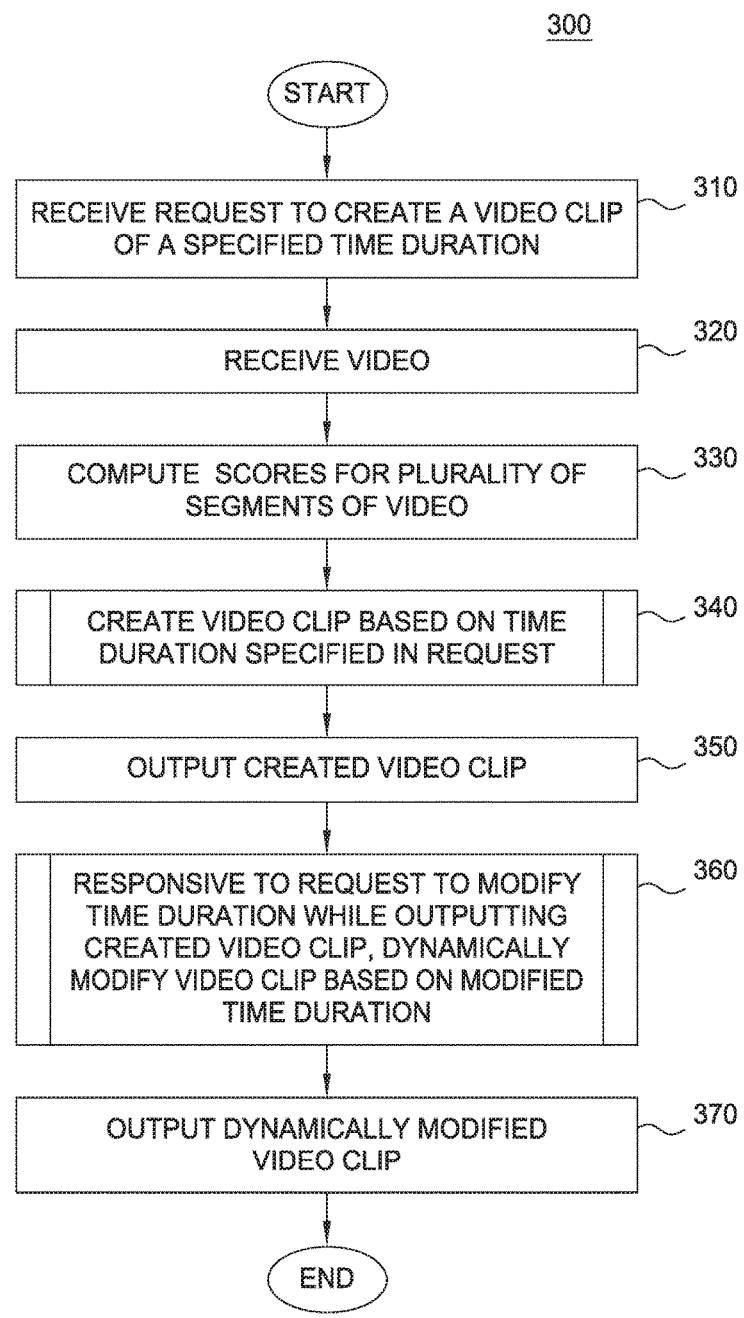
FIG. 3 illustrates a method to provide prioritized playback of media content clips, according to one embodiment.

FIG. 3 illustrates a method 300 to provide prioritized playback of media content clips, according to one embodiment. In at least one embodiment, the clip application 212 performs the method 300. As shown, the method 300 begins at block 310, where the clip application 212 receives a request to create a clip of a video (or other type of media file), where the request specifies a time duration for the clip (e.g., 5 minutes of a 30 minute television show). The request may specify a URL of the clip, which may be in the media content 215 or a remote data source. In at least one embodiment, the request may specify a desired metric for use in generating the video clip. For example, a user may specify to use crowd noise as the metric for which the scores for each segment of the video are computed (or have been computed). In some embodiments, the user may change the metric being measured during generation and/or playback of the video clip. For example, the user may change the desired metric from crowd noise to social media sentiment. In such embodiments, the clip application 212 would invoke the method 300 to generate the video clip using social media sentiment as the desired metric.

At block 320, the clip application 212 receives the video. The clip application 212 may receive the video from the location specified in the URL (e.g., the media content 215, or a remote source via the network 230). At block 330, the clip application 212 invokes one or more algorithms to compute a score for each of a plurality of segments of the video. As previously indicated, the clip application 212 may generate the segments by dividing the video into segments of a specified length (e.g., 5 seconds). The algorithms 213 may compute metric values for each segment, where each metric value reflects at least one attribute of the respective segment of video (such as crowd noise, social media sentiment, popularity, etc.). In at least one embodiment, the clip application 212 may compute the scores for the plurality of segments prior to receiving the request to create the clip at block 310. The computed scores may be based on each of a plurality of metrics. In such embodiments, the video and the corresponding scores may be stored in the media content 215 prior to receiving the request, and provided as input to the clip application 212. Further still, in such embodiments, the clip application 212 may identify (or compute) the appropriate scores based on the metric requested by the user as part of the request. The scores may be computed by any number of devices. For example, a set top box used by the user to view videos may compute the scores. As another example, the computation of the scores may be offloaded to a cloud service which provides dedicated cloud computing resources for computing scores. As still another example, the scores may be computed by the servers of a company hosting the videos.

At block 340, described in greater detail with reference to FIG. 4, the clip application 212 creates the video clip based on the time duration specified in the request received at block 310. Generally, the clip application 212 generates the video clip by identifying the segments of the video that have the highest associated metric values, where the total duration of the identified segments approximate the time duration requested by the user. At block 350, the clip application 212 may output the created video clip (and/or store the created video clip in the media clips 216). At block 360, the user may specify to modify the time duration of the outputted video clip. As such, the clip application 212 may dynamically modify the video clip based on the modified time duration as described in greater detail with reference to FIG. 5. At block 370, the clip application 212 may output the dynamically modified video clip. Generally, the user may modify the time duration any number of times. In response, the clip application 212 may modify the video clip each time, and output the modified video clip accordingly.

Figure 4:
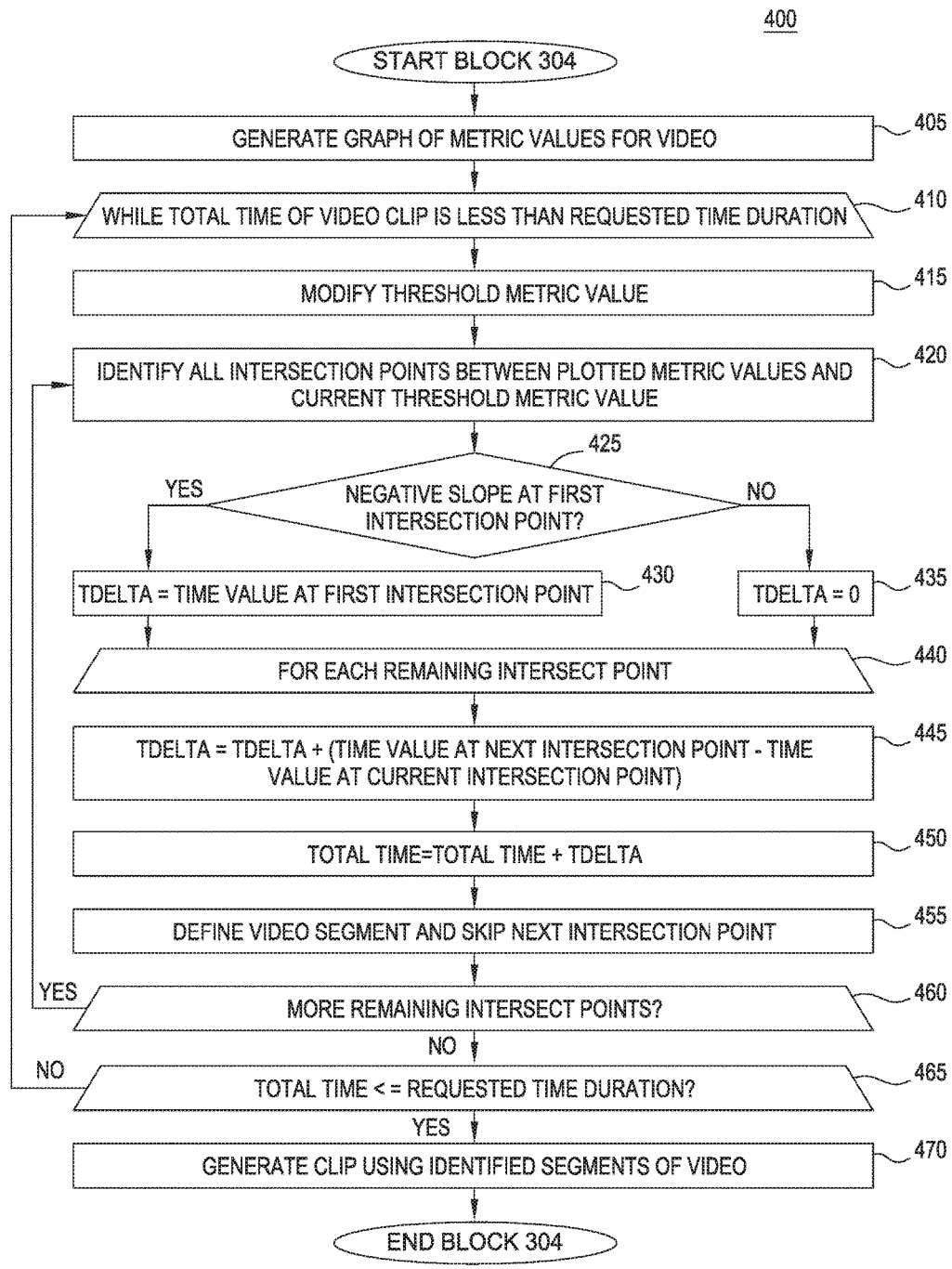
FIG. 4 is a flow chart illustrating an example method to create a video clip, according to one embodiment.

FIG. 4 is a flow chart illustrating an example method 400 corresponding to block 340 to create a video clip, according to one embodiment. As shown, the method 400 begins at block 405, where the clip application 212 plots the metric values for each of the plurality of segments of videos to create a graph of metric values for the video, such as the graph 100 including the line 101 depicted in FIG. 1A. At block 410, the clip application 212 executes a loop including blocks 415-460 while the total time of the video clip is less than the user-specified clip time duration. At block 415, the clip application 212 may modify a threshold metric value for the metric. Initially, the threshold metric value may defined as any value, such as the maximum metric value computed for a video segment, the highest possible metric value, the $90^{th}$ percentile metric value, the average metric value, and the like. In subsequent iterations, the threshold metric value may be decreased so as to result in additional intersection points between the line corresponding to the threshold value and the metric values for the video segments. For example, the threshold metric value may be decreased by a predefined value, a percentage value, and the like.

At block 420, the clip application 212 identifies all intersection points between the metric values of the graph generated at block 405 and the current threshold metric value. In at least one embodiment, the clip application 212 creates an ordered list of metric values, where the list is ordered based on the corresponding time of the video segment (e.g., intersection points at 1, 1.5, 8, and 10 minutes of the video). At block 425, the clip application 212 determines whether the slope of the line of metric values (e.g., the line 101) at the first intersection point of the ordered list of intersection points is negative. If the slope is negative (e.g., the metric values are decreasing at the first intersection point), the clip application 212 proceeds to block 430.

At block 430, the clip application 212 sets a value, tdelta (corresponding to a delta time value), to equal the time value (e.g., the x-axis value) at the first intersection point. For example, continuing with the example intersection points at 1, 1.5, 8, and 10 minutes of video, if the slope is negative at 1 minute, the tdelta value would equal 1 (or 60 seconds if measured in seconds). The clip application 212 may then proceed to block 440. Returning to block 425, if the slope of the line of metric values is not negative, (e.g., the metric values are increasing at the first intersection point), the clip application 212 proceeds to block 435. At block 435, the clip application 212 sets the value of tdelta to equal zero. The clip application 212 may then proceed to block 440.

At block 440, the clip application 212 executes a loop including blocks 445-460 for each remaining intersect point in the current list of intersection points. At block 445, the clip application 212 sets the value of tdelta to equal the current value of tdelta plus the time value (i.e., the x-axis value) at the next intersection point minus the time value (i.e., the x-axis value) at the current intersection point. If there is no next intersection point, the x-value at the end of the graph is substituted for the time value at the next intersection point in the previous equation. Continuing with the previous example, the example tdelta value would now equal 1+(1.5−1)=1.5. At block 450 the clip application 212 may set a total time value (which is initially set to zero) as the total time value plus the current tdelta value. Doing so allows the clip application 212 to track the current total amount of time of the overall video clip. At block 455, the clip application 212 defines a segment of video based on the two intersection points used in the current iteration of the loop. The clip application 212 may also skip the next intersection point (as the next intersection point completes the current segment of video) for subsequent iterations of the loop.

At block 460, the clip application 212 determines whether more intersection points in the current list of intersection points remain. If more intersection points remain, the clip application 212 returns to block 440. If no more intersection points remain, the clip application 212 proceeds to block 465, where the clip application 212 determines whether the total time of all video segments used in the video clip are less or equal to than the requested time duration for the video clip. If so, the clip application 212 returns to block 410. For example, if the total time of all segments of video used in the video clip equals 1 minute, and the user requested a five minute video clip, the clip application 212 needs to add more segments of video to the video clip to approximate the requested total time duration. If the total time equals or exceeds the requested duration, the clip application 212 proceeds to block 470, where the clip application 212 generates a video clip using the identified video segments. In at least one embodiment, the clip application 212 generates the video clip by creating an ordered (based on the ordering in the video) sequence of each segment of the video. The clip application 212 may include any type of interstitial material or effects between each segment, such as introductory information for the upcoming segment, metadata of the upcoming segment, and the like.

Figure 5:
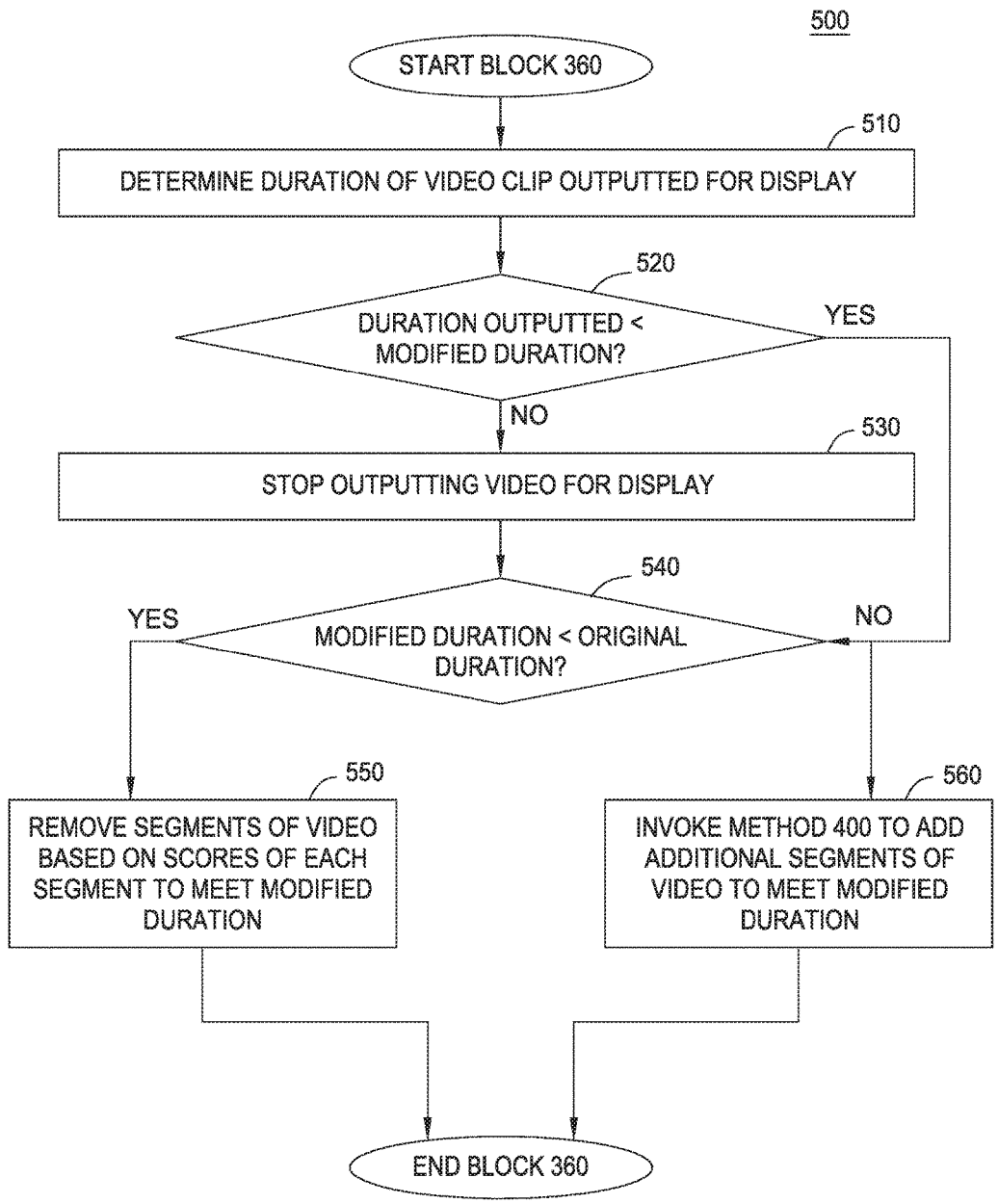
FIG. 5 is a flow chart illustrating an example method to dynamically modify a video clip, according to one embodiment.

FIG. 5 is a flow chart illustrating an example method 500 corresponding to block 360 to dynamically modify a video clip, according to one embodiment. As previously indicated, a user may begin playback of a video clip. However, the user's available time to watch the video clip may change as the user watches the video clip. As such, the user may inform the clip application 212 of a modified duration time value. Therefore the clip application 212 may invoke the method 500 to modify the existing clip.

As shown, the method 500 begins at block 510, where the clip application 212 determines the duration of the video clip that has been outputted for display. At block 520, the clip application 212 determines whether the duration of outputted video identified at block 510 is less than the modified duration provided by the user at block 360. For example, the user may have modified the duration of the clip to equal 5 minutes at block 360, while 3 minutes of the video clip (which approximately equals 5 minutes) have been outputted for display when the user modifies the duration of the clip. If the duration outputted for display is not less than the modified duration, the clip application 212 proceeds to block 530, where the clip application 212 stops outputting the video for display. If the duration outputted for display is less than the modified duration, the clip application 212 proceeds to block 540.

At block 540, the clip application 212 determines whether the modified duration is less than the original duration of the video clip specified by the user. If the modified duration is less than the original duration, the clip application 212 proceeds to block 550 to shorten the length of the video clip. At block 550, the clip application 212 removes segments of video from the video clip to meet the modified duration of the video clip. For example, if the video clip includes 10 remaining segments of video that have not been outputted for display, the clip application 212 may remove the remaining segments having the lowest metric values (individually or in the aggregate) until the modified duration is approximately met by the modified video clip.

Returning to block 540, if the modified duration is not less than the original duration, the video clip needs to be lengthened, and the clip application 212 proceeds to block 560. At block 560, the clip application 212 invokes the method 400 to add additional segments of video to meet the modified time duration. Generally, in doing so, the clip application 212 adds the segments of video that have the highest metric values (that were not originally included in the video clip generated at block 340). In doing so, the clip application 212 may lengthen the time duration of a segment included in the video clip. For example, a first segment of the video clip may initially include a 10 second clip of video starting at the 3 minute point of the video. However, the modified video clip may now include a 20 second clip of video starting at the 2 minute, 55 second point of the video. Similarly, the clip application 212 may add segments to the video clip. Continuing with the previous example, instead of expanding the 10 second clip starting at the 3 minute point of the video to 20 seconds, the clip application 212 may add a 10 second clip beginning at the 2 minute point of the video.

Advantageously, embodiments disclosed herein provide techniques to generate "clips" of media files, such as audio clips and video clips, where the clips include the most relevant or interesting portions of the media files. Furthermore, embodiments disclosed herein may dynamically modify the generated clips during playback to meet a modified time duration specified by the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the clip application 212 could execute on a computing system in the cloud. In such a case, the user clip application 212 may store media clips 215 for users at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
responsive to a request to create a clip of a media file, wherein the request specifies a time duration for the clip:
  receiving a plurality of metric values, wherein each metric value corresponds to a respective segment of a plurality of segments of the media file;
  identifying a first segment and a second segment of the plurality of segments of the media file having a respective metric value that exceeds a threshold metric value, by:
    generating a graph plotting each of the plurality of metric values versus a corresponding time of the media file for each of the plurality of metric values;
    determining that a time duration of the first segment generated based on two intersection points between the threshold metric value and the plurality of metric values of the graph does not exceed the time duration for the clip;
    lowering the threshold metric value;
    identifying four intersection points between the lowered threshold metric value and the plotted plurality of metric values;
    defining the first segment of the media file based on a first two intersection points between the lowered threshold metric value and the plotted plurality of metric values; and
    defining the second segment of the media file based on a second two intersection points between the lowered threshold metric value and the plotted plurality of metric values; and
  generating the clip of the media file having a time duration based on the time duration specified in the request, wherein the clip of the media file includes at least the first and second segments of the media file.

2. The method of claim 1, wherein identifying the first and second segments further comprises prior to determining that the time duration of the first segment does not exceed the time duration for the clip:
  defining the threshold metric value;
  creating a line in the graph corresponding to the threshold metric value;
  identifying the two intersection points between the line corresponding to the threshold metric value and the plotted plurality of metric values; and
  defining the first segment of the media file based on the identified two intersection points.

3. The method of claim 2, further comprising:
subsequent to determining that the time duration of the first segment of the media file does not exceed the specified time duration of the media clip:
  modifying the line in the graph to correspond to the lowered threshold metric value; and
  identifying the first two intersection points and the second two intersection points between the line corresponding to the lowered threshold metric value and the plotted plurality of metric values.

4. The method of claim 1, further comprising:
outputting the generated clip;
receiving an updated time duration for the clip, wherein the updated time duration is different than the time duration specified in the received request;
modifying the generated clip based on the updated time duration; and
outputting the modified clip.

5. The method of claim 4, wherein modifying the generated clip comprises:
  determining that the updated time duration is greater than the time duration specified in the request;
  identifying a third segment of the media file, of the plurality of segments of the media file, based on the metric values of the plurality of segments of the media file; and
  generating the modified clip to include the first, second, and third segments of the media file.

6. The method of claim 4, wherein modifying the generated clip comprises:
  determining that the updated time duration is less than the time duration specified in the request; and
  performing a predefined operation to reduce a total time of the generated media clip, wherein the predefined operation comprises one or more of: (i) deleting the second segment of the plurality of segments of the media file from the generated media clip, and (ii) deleting at least a first portion of one of the first and second segments of the generated media clip, wherein the first portion has not been outputted prior to performing the predefined operation to reduce the total time of the generated media clip.

7. The method of claim 1, wherein the media file comprises one of: (i) a video file and (ii) an audio file, wherein the plurality of metric values are computed using at least one algorithm, wherein the plurality of metric values reflect at least one attribute of each segment of the media file, wherein the at least one attribute comprises: (i) a relevance, (ii) an importance, and (iii) a social media sentiment of each respective segment of the media file.

8. A computer program product, comprising:
a non-transitory computer-readable storage medium having computer readable program code embodied therewith, the computer readable program code executable by a processor to perform an operation comprising:
  responsive to a request to create a clip of a media file, wherein the request specifies a time duration for the clip:
    receiving a plurality of metric values, wherein each metric value corresponds to a respective segment of a plurality of segments of the media file;

identifying a first segment and a second segment of the plurality of segments of the media file having a respective metric value that exceeds a threshold metric value, by:
  generating a graph plotting each of the plurality of metric values versus a corresponding time of the media file for each of the plurality of metric values;
  determining that a time duration of the first segment generated based on two intersection points between the threshold metric value and the plurality of metric values of the graph does not exceed the time duration for the clip;
  lowering the threshold metric value;
  identifying four intersection points between the lowered threshold metric value and the plotted plurality of metric values;
  defining the first segment of the media file based on a first two intersection points between the lowered threshold metric value and the plotted plurality of metric values; and
  defining the second segment of the media file based on a second two intersection points between the lowered threshold metric value and the plotted plurality of metric values; and
generating the clip of the media file having a time duration based on the time duration specified in the request, wherein the clip of the media file includes at least the first and second segments of the media file.

9. The computer program product of claim 8, wherein identifying the first and second segments further comprises prior to determining that the time duration of the first segment does not exceed the time duration for the clip:
  defining the threshold metric value;
  creating a line in the graph corresponding to the threshold metric value;
  identifying the two intersection points between the line corresponding to the threshold metric value and the plotted plurality of metric values; and
  defining the first segment of the media file based on the identified two intersection points.

10. The computer program product of claim 9, the operation further comprising:
  subsequent to determining that the time duration of the first segment of the media file does not exceed the specified time duration of the media clip:
    modifying the line in the graph to correspond to the lowered threshold metric value; and
    identifying the first two intersection points and the second two intersection points between the line corresponding to the lowered threshold metric value and the plotted plurality of metric values.

11. The computer program product of claim 8, the operation further comprising:
  outputting the generated clip;
  receiving an updated time duration for the clip, wherein the updated time duration is different than the time duration specified in the received request;
  modifying the generated clip based on the updated time duration; and
  outputting the modified clip.

12. The computer program product of claim 11, wherein modifying the generated clip comprises:
  determining that the updated time duration is greater than the time duration specified in the request;
  identifying a third segment of the media file, of the plurality of segments of the media file, based on the metric values of the plurality of segments of the media file; and
  generating the modified clip to include the first, second, and third segments of the media file.

13. The computer program product of claim 11, wherein modifying the generated clip comprises:
  determining that the updated time duration is less than the time duration specified in the request; and
  performing a predefined operation to reduce a total time of the generated media clip, wherein the predefined operation comprises one or more of: (i) deleting the second segment of the plurality of segments of the media file from the generated media clip, and (ii) deleting at least a first portion of one of the first and second segments of the generated media clip, wherein the first portion has not been outputted prior to performing the predefined operation to reduce the total time of the generated media clip.

14. The computer program product of claim 8, wherein the media file comprises one of: (i) a video file and (ii) an audio file, wherein the plurality of metric values are computed using at least one algorithm, wherein the plurality of metric values reflect at least one attribute of each segment of the media file, wherein the at least one attribute comprises: (i) a relevance, (ii) an importance, and (iii) a social media sentiment of each respective segment of the media file.

15. A system, comprising:
  a processor; and
  a memory storing one or more instructions which, when executed by the processor, performs an operation comprising:
    responsive to a request to create a clip of a media file, wherein the request specifies a time duration for the clip:
      receiving a plurality of metric values, wherein each metric value corresponds to a respective segment of a plurality of segments of the media file;
      identifying a first segment and a second segment of the plurality of segments of the media file having a respective metric value that exceeds a threshold metric value, by:
        generating a graph plotting each of the plurality of metric values versus a corresponding time of the media file for each of the plurality of metric values;
        determining that a time duration of the first segment generated based on two intersection points between the threshold metric value and the plurality of metric values of the graph does not exceed the time duration for the clip;
        lowering the threshold metric value;
        identifying four intersection points between the lowered threshold metric value and the plotted plurality of metric values;
        defining the first segment of the media file based on a first two intersection points between the lowered threshold metric value and the plotted plurality of metric values; and
        defining the second segment of the media file based on a second two intersection points between the lowered threshold metric value and the plotted plurality of metric values; and
      generating the clip of the media file having a time duration based on the time duration specified in the request, wherein the clip of the media file includes at least the first and second segments of the media file.

16. The system of claim 15, wherein identifying the first and second segments further comprises prior to determining that the time duration of the first segment does not exceed the time duration for the clip:
  defining the threshold metric value;
  creating a line in the graph corresponding to the threshold metric value;
  identifying the two intersection points between the line corresponding to the threshold metric value and the plotted plurality of metric values; and
  defining the first segment of the media file based on the identified two intersection points.

17. The system of claim 16, the operation further comprising:
  subsequent to determining that the time duration of the first segment of the media file does not exceed the specified time duration of the media clip:
    modifying the line in the graph to correspond to the lowered threshold metric value; and
    identifying the first two intersection points and the second two intersection points between the line corresponding to the lowered threshold metric value and the plotted plurality of metric values.

18. The system of claim 15, the operation further comprising:
  outputting the generated clip;
  receiving an updated time duration for the clip, wherein the updated time duration is different than the time duration specified in the received request;
  modifying the generated clip based on the updated time duration; and
  outputting the modified clip.

19. The system of claim 18, wherein modifying the generated clip comprises:
  determining that the updated time duration is greater than the time duration specified in the request;
  identifying a third segment of the media file, of the plurality of segments of the media file, based on the metric values of the plurality of segments of the media file; and
  generating the modified clip to include the first, second, and third segments of the media file.

20. The system of claim 18, wherein the media file comprises one of: (i) a video file and (ii) an audio file, wherein the plurality of metric values are computed using at least one algorithm, wherein the plurality of metric values reflect at least one attribute of each segment of the media file, wherein the at least one attribute comprises: (i) a relevance, (ii) an importance, and (iii) a social media sentiment of each respective segment of the media file, wherein modifying the generated clip comprises:
  determining that the updated time duration is less than the time duration specified in the request; and
  performing a predefined operation to reduce a total time of the generated media clip, wherein the predefined operation comprises one or more of: (i) deleting the second segment of the plurality of segments of the media file from the generated media clip, and (ii) deleting at least a first portion of one of the first and second segments of the generated media clip, wherein the first portion has not been outputted prior to performing the predefined operation to reduce the total time of the generated media clip.

* * * * *